US009866508B2

(12) United States Patent
Daher et al.

(10) Patent No.: US 9,866,508 B2
(45) Date of Patent: Jan. 9, 2018

(54) AGGREGATING AND PRESENTING RECENT ACTIVITIES FOR SYNCHRONIZED ONLINE CONTENT MANAGEMENT SYSTEMS

(71) Applicant: Dropbox, Inc., San Francisco, CA (US)

(72) Inventors: Waseem Daher, Palo Alto, CA (US); Alexander Miles, Oakland, CA (US); Nathan Borror, Palo Alto, CA (US); David Kjelkerud, San Francisco, CA (US)

(73) Assignee: Dropbox, Inc., San Francisco, CA (US)

( * ) Notice: Subject to any disclaimer, the term of this patent is extended or adjusted under 35 U.S.C. 154(b) by 257 days.

(21) Appl. No.: 14/700,820

(22) Filed: Apr. 30, 2015

(65) Prior Publication Data

US 2016/0294916 A1    Oct. 6, 2016

Related U.S. Application Data

(60) Provisional application No. 62/142,183, filed on Apr. 2, 2015.

(51) Int. Cl.
*H04L 29/08* (2006.01)
*H04L 12/58* (2006.01)
*H04L 12/24* (2006.01)

(52) U.S. Cl.
CPC .............. *H04L 51/08* (2013.01); *H04L 51/16* (2013.01); *H04L 67/1095* (2013.01); *H04L 67/22* (2013.01); *H04L 67/306* (2013.01)

(58) Field of Classification Search
CPC ... H04L 67/02; H04L 41/0893; H04L 67/306; H04L 67/22; H04L 51/08; H04L 51/16;
(Continued)

(56) References Cited

U.S. PATENT DOCUMENTS 7,076,546 B1 * 7/2006 Bates ................ G06F 17/30861
                                                  707/E17.107
7,565,175 B2 * 7/2009 Pell ................... G06F 17/30905
                                                    455/566
(Continued)

FOREIGN PATENT DOCUMENTS

CA     CA 2520621 A1 * 10/2004 ......... H04N 5/44543
EP         2407921 A1 * 1/2012 ......... G06Q 30/0201
(Continued)

OTHER PUBLICATIONS

Xianqiang Bao et al., "Sync Views: Toward Consistent User Views in Cloud-based File Synchronization Services," National University of Defense Technology, Hunan 410073, China; Wayne State University, Detroit, Michigan 48202, USA.

*Primary Examiner* — Kostas Katsikis
(74) *Attorney, Agent, or Firm* — Polsinelli PC (57) ABSTRACT

Systems, methods, and computer-readable storage media for aggregating and presenting recent activities for online synchronized content management system are disclosed. The system can identify recent events that are associated with a user account in a content management system. The recent events may refer to events or activities that have occurred within a threshold time duration in the past, across one or more client devices that are associated with the user account. The recent events may be about creating, modifying, viewing, accessing, renaming, deleting, or sharing of content. The system can aggregate two or more events in those recent events into one aggregated event when they meet a criterion, such as folder location similarity, time proximity, file type similarity, file name similarity, geographic proximity, user preference, etc. The system can then present the aggregated recent events at one of the client devices.

18 Claims, 7 Drawing Sheets

(58) Field of Classification Search
CPC ......... H04L 51/32; H04L 51/12; H04L 51/10; H04L 51/24
See application file for complete search history.

(56) References Cited

U.S. PATENT DOCUMENTS

| | | | | |
|---|---|---|---|---|
| 7,660,815 B1 * | 2/2010 | Scofield | G06F 17/30702 | 707/999.102 |
| 7,685,192 B1 * | 3/2010 | Scofield | G06F 17/30873 | 707/709 |
| 8,229,888 B1 * | 7/2012 | Roskind | H04N 21/25808 | 707/611 |
| 8,386,509 B1 * | 2/2013 | Scofield | G06F 17/30867 | 707/706 |
| 8,612,470 B1 * | 12/2013 | Fushman | G06F 17/30867 | 707/749 |
| 8,631,076 B1 * | 1/2014 | Auerbach | H04L 51/04 | 709/206 |
| 8,682,903 B2 | 3/2014 | Deen et al. | | |
| 9,026,941 B1 * | 5/2015 | Krueger | G06F 3/048 | 705/7.13 |
| 9,058,563 B1 * | 6/2015 | Krueger | G06F 17/30 | |
| 9,077,812 B2 * | 7/2015 | Hansen | H04M 1/72547 | |
| 9,189,491 B2 * | 11/2015 | Fushman | G06F 17/30867 | |
| 9,189,514 B1 * | 11/2015 | Myslinski | G06Q 30/0255 | |
| 9,310,881 B2 * | 4/2016 | Hansen | G06F 3/0487 | |
| 9,386,435 B2 * | 7/2016 | Wang | G06F 3/0488 | |
| 9,407,751 B2 * | 8/2016 | Hansen | G06F 9/4451 | |
| 9,524,071 B2 * | 12/2016 | Auer | G06Q 10/10 | |
| 2007/0061245 A1 * | 3/2007 | Ramer | G06F 17/30867 | 705/37 |
| 2007/0192797 A1 | 8/2007 | Kang et al. | | |
| 2008/0009268 A1 * | 1/2008 | Ramer | G06F 17/30867 | 455/412.1 |
| 2008/0276179 A1 | 11/2008 | Borenstein et al. | | |
| 2009/0171754 A1 * | 7/2009 | Kane | G06F 17/30867 | 705/14.53 |
| 2009/0171755 A1 * | 7/2009 | Kane | G06Q 20/10 | 705/14.16 |
| 2009/0171968 A1 * | 7/2009 | Kane | G06F 17/30867 | |
| 2009/0172021 A1 * | 7/2009 | Kane | G06F 17/30873 | |
| 2009/0172551 A1 * | 7/2009 | Kane | G06Q 30/02 | 715/733 |
| 2009/0177744 A1 * | 7/2009 | Marlow | G06Q 10/10 | 709/204 |
| 2010/0211575 A1 * | 8/2010 | Collins | G06F 17/30044 | 707/749 |
| 2011/0137916 A1 * | 6/2011 | Deen | G06F 17/3002 | 707/747 |
| 2011/0154255 A1 | 6/2011 | Ryu et al. | | |
| 2013/0061267 A1 * | 3/2013 | Cansino | H04N 21/4126 | 725/43 |
| 2013/0110949 A1 * | 5/2013 | Maurel | G06Q 30/02 | 709/206 |
| 2013/0132896 A1 * | 5/2013 | Lee | G06F 17/30997 | 715/808 |
| 2013/0212491 A1 * | 8/2013 | Yerli | H04L 51/32 | 715/753 |
| 2013/0218961 A1 * | 8/2013 | Ho | G06Q 30/02 | 709/204 |
| 2013/0238540 A1 * | 9/2013 | O'Donoghue | G06N 5/02 | 706/46 |
| 2013/0238686 A1 * | 9/2013 | O'Donoghue | G06Q 30/02 | 709/203 |
| 2013/0304616 A1 * | 11/2013 | Raleigh | G06Q 20/145 | 705/34 |
| 2014/0075328 A1 * | 3/2014 | Hansen | G06F 3/0487 | 715/747 |
| 2014/0075351 A1 * | 3/2014 | Hansen | H04M 1/72547 | 715/765 |
| 2014/0075352 A1 * | 3/2014 | Hansen | G06F 9/4451 | 715/765 |
| 2014/0075385 A1 * | 3/2014 | Wan | G06Q 10/1093 | 715/812 |
| 2014/0189097 A1 * | 7/2014 | Sidi | H04L 43/045 | 709/224 |
| 2014/0331265 A1 * | 11/2014 | Mozell | H04N 21/2668 | 725/93 |
| 2014/0344411 A1 * | 11/2014 | Gailis | H04L 67/26 | 709/219 |
| 2015/0100580 A1 * | 4/2015 | Mathur | G06Q 10/107 | 707/737 |
| 2015/0134603 A1 * | 5/2015 | Melamed | G06F 11/1453 | 707/609 |
| 2015/0142888 A1 * | 5/2015 | Browning | H04L 12/1831 | 709/204 |
| 2015/0178388 A1 * | 6/2015 | Winnemoeller | G06F 17/30864 | 707/722 |
| 2015/0236925 A1 * | 8/2015 | Bodz | H04L 41/50 | 709/203 |
| 2015/0348192 A1 * | 12/2015 | Broder | G06Q 40/06 | 705/36 R |
| 2016/0088102 A1 * | 3/2016 | Zabaluev | H04L 67/22 | 715/736 |

FOREIGN PATENT DOCUMENTS

| | | | | |
|---|---|---|---|---|
| WO | WO 2004091187 A2 * | 10/2004 | | H04N 5/44543 |
| WO | WO 2007022560 A1 * | 3/2007 | | G06F 17/30551 |
| WO | WO 2007108907 A2 * | 9/2007 | | H04L 65/1026 |
| WO | WO 2008040016 A1 * | 4/2008 | | G06F 17/30893 |
| WO | WO 2010141506 A1 * | 12/2010 | | G06F 17/30041 |
| WO | WO 2014039657 A1 * | 3/2014 | | G06Q 30/02 |

* cited by examiner

AGGREGATING AND PRESENTING RECENT ACTIVITIES FOR SYNCHRONIZED ONLINE CONTENT MANAGEMENT SYSTEMS

CROSS REFERENCE TO RELATED APPLICATIONS

This claims the benefit of U.S. Provisional Application No. 62/142,183, filed on Apr. 2, 2015, which is expressly incorporated by reference herein in its entirety.

BACKGROUND

Users of synchronized online content management systems, such as Dropbox from Dropbox Inc. of San Francisco, Calif., may store hundreds, or even thousands, of content items in their content management system user accounts. The users of these services often need to navigate through complex hierarchical folder structures that require clicking through multiple layers of folders to get to a particular content item that they want. Accessing content in this manner can be cumbersome and inconvenient, especially when a user needs to repeatedly access the same set of content items on a regular basis. For example, a researcher composing a long report over an extended period of time may have to navigate through the same layers of multiple folder structures every time she opens the report document.

Things can get more complicated when the user wants to access a particular content item on one of her devices after having just accessed the same content item on another device. For example, if a user creates a slideshow presentation file on his laptop computer, have the file synchronized with the online content management system, and wishes to open the same document from his tablet device, he may have to start from the "root" folder in his user account and step through the multiple layers of folder structures on the tablet device to locate and retrieve the file.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media for tracking, aggregating and presenting recent activities for synchronized online content management systems. A system may identify events or activities associated with a user account in a synchronized online content management system. The events and activities may have taken place on and collected from a plurality of client devices that are associated with the user account. The events or activities may be one or more of adding, modifying, viewing, accessing, renaming, deleting, sharing, or revoking sharing of a content item. A client application on the client device can monitor the device's file system to identify any changes or updates to the synchronized content items.

The system can identify some of those events and activities as having occurred "recently," meaning within a predetermined time duration from the present time in the past (e.g., within the last 72 hours). These recent events and activities can be presented to the user via the client device's user interface. They can be presented in the form of a scrollable list. The list can be presented in a chronological fashion (in descending or ascending order). The list can include such information as the identity of the content item involved in the event or activity, related user account, related client device, timestamp of the event or activity, preview, follow-up action, etc. The list can be configured to display only certain types of information depending on the client device. For example, the list can be configured to display files that have been added or edited on any of the client devices, but display the files that have been viewed on the local device only. It can also be configured to include the user's own activity, the other users' activity, or a combination of both.

Some of the recent activities that are related to each other can be consolidated into one entry in the user interface. Determining how closely related the events or activities are can be based on one or more criteria, such as proximity in time, proximity in geolocation, filename similarity, content type similarity, file size similarity, content similarity, folder path similarity, etc. By accessing the list of recent events or activities, the user can quickly recall recently accessed content items.

BRIEF DESCRIPTION OF THE DRAWINGS

The above-recited and other advantages and features of the disclosure will become apparent by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The disclosed technology addresses the need in the art for an improved technique for accessing and interacting with data synchronized with an online content management system using a client device. The disclosed technology can enable a user of a client device to located recently accessed files with ease. The client device can include a client-side application corresponding to an online content management system. The client-side application can communicate with the online content management system to synchronized data stored locally on the client device with data stored on the online content management system. The client-side application or a web browser running on the client device can present a list of recently accessed content based on the user's recent activities. The list of recently accessed content can be based on more than one client device owned by the user. Furthermore, some related content items included in the list can be consolidated or aggregated to save space and offer more concise and impactful presentation of the information. Advantages of the cross-device, cross-platform recent activities list include faster and easier access to content, preservation of history data, and unified notification for disparate information types.

As used herein, the terms "access," "activity," and "event" may be used interchangeably when they are used in the context of a content item such as a file or folder. Specifically, when a user creates, adds, opens, views, upload, downloads, edits, modifies, renames, removes, moves, copies, deletes, shares, and/or revokes a content item, such an act may be referred to as an access, activity, or event. By the same token, a "recent access," "recent activity," and "recent event" may refer to an instance of any of those actions that happened within a predetermined time period in the past. The predetermined time period can be set by a user or the content management system.

Figure 1:
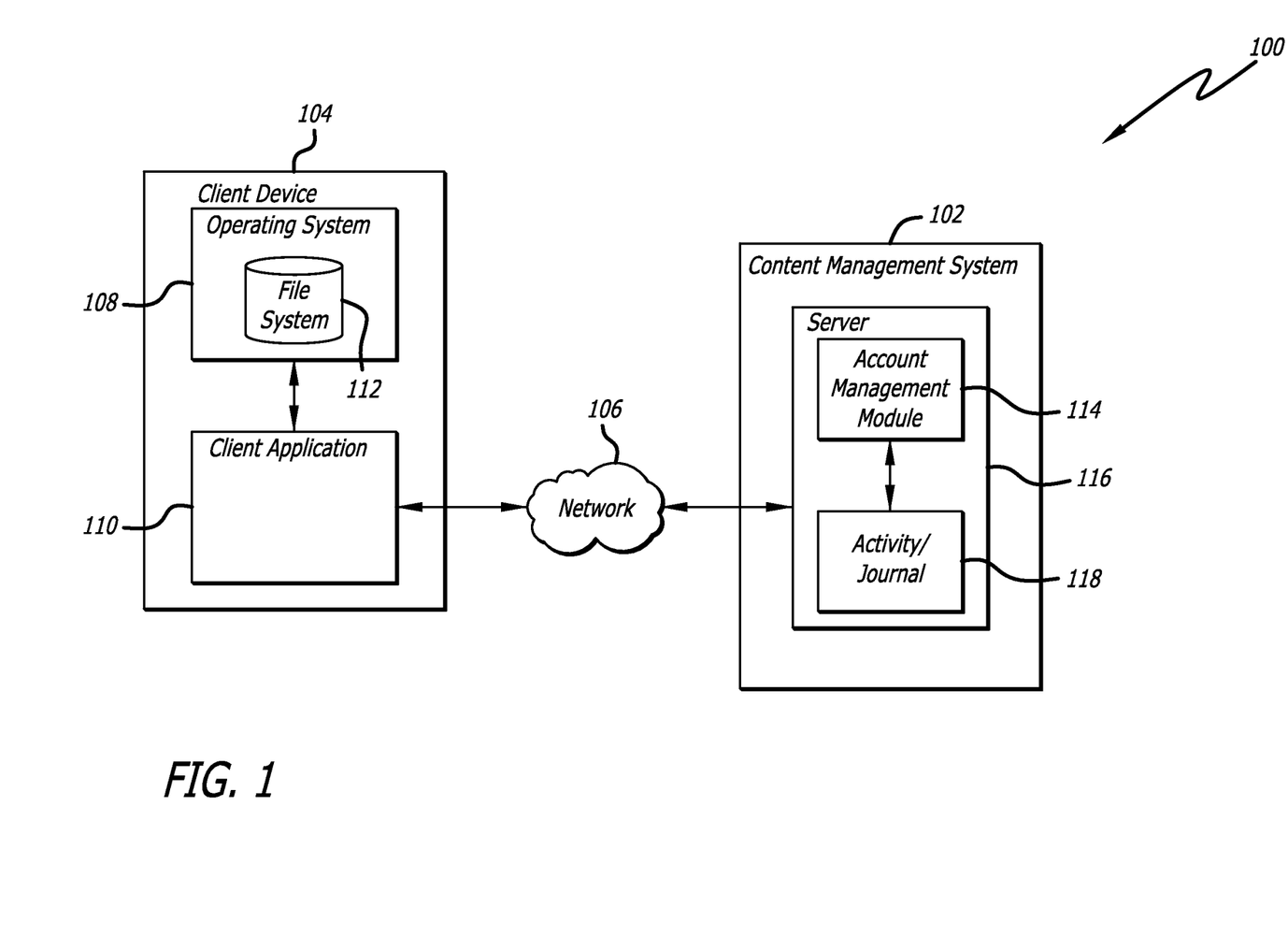
FIG. 1 shows a block diagram of an exemplary system embodiment for monitoring recent activities on a synchronized online content management system.

FIG. 1 shows a block diagram of an exemplary system embodiment for monitoring recent activities on a synchronized online content management system. Exemplary system 100 consists of online synchronized content management system 102 and one or more client devices, including client device 104. Content management system 102 can communicate with client devices such as client device 104 via network 106. Network 106 such as the Internet. Content management system 102, as will be discussed later, can run on server 114 or a group of servers. Server 106 can have one or more software and/or hardware modules that perform distinct functions. For example, server 106 can have account management module 116 and activity journal 118. One of ordinary skill in the art will understand that server 114 can have other software or hardware modules and components that serve different purposes, as will be discussed further in FIG. 8.

Server 106 can store information for various user accounts that are registered with content management system 102. The user accounts may be managed by account management module 116 and/or user account database of content management system 102. The user accounts are tied to individual users, clients, members, or subscribers that use the services provided by content management system 102. The user accounts hold information about respective users' profiles, credentials, synchronized data, membership information, etc. For example, a user account may be associated with the user's personal information (e.g., name, address, email address, phone number, etc.), login credentials (e.g., username, password, security questions, cryptographic nonces, etc.), synchronized data (e.g., files, folders, documents, etc.), and membership information (e.g., date joined, membership tier, subscription status, billing information, standing, etc.).

Server 114 may also have activity journal 118 to keep track of the users' activities. Activity journal 118 can be a log or database that records each action that a user may perform, such as adding, editing, viewing, moving renaming, sharing, deleting content on client device 104 or content management system 102. Each journal entry in activity journal 118 can be augmented with metadata such as timestamp, user identity, priority, etc. Content management system 102 can simultaneously monitor multiple client devices used by one or more users. Thus, activity journal 118 may contain activity data pertaining to multiple user accounts. For example, activity journal 118 may describe instances of a spreadsheet document newly created on one client device, a photo renamed on another client device, a folder shared with the public on yet another client device, and a text document downloaded from content management system 102 through its web interface.

A subscriber of content management system 102 can use client device 104 to access content on content management system 102 as well as synchronize locally stored content with content management system 102. Client device 104 can be any electronic device that is equipped with a central processing unit (CPU), storage, and a communications interface, as will be further discussed in FIGS. 8A-8B. For example, client device 104 can be a personal computer, a desktop computer, a laptop computer, a mobile device, a telephone, a smartphone, a tablet device, a wearable computing device, a set-top box, an appliance, etc. Client device 104 can run operating system 108 and application software such as client application 110. Operating system 108 is system software that manages hardware and software resources that are available on client device 104 and provides common services for applications such as client application 110. Part of operating system 108 is file system 112 that controls and manages client device's 104 storage (not shown). For example, file system 112 can organize data and content that are stored in the storage system (e.g., random access memory, hard disk, optical disk, solid-state drive, etc.) into logical compartments such as files, folders, directories, partitions, volumes, etc. In addition, file system 112 can read, write, modify, delete, rename, encrypt/decrypt files and folders.

Client application 110 (also called, "client-side application," "desktop application," etc.) may be installed and running on client device 104. Client application 110 can be a native application that runs on operating system 108. For example, if client device 104 is a Windows® PC, client application 112 can be a Windows® application. In another example, if client device 104 is an iPhone® mobile smartphone, client application 112 can be an iOS® app. Users can download client application 110 from a website (such as content management system's 100 own website) or an application marketplace, and install it on client device 104. A dedicated client application such as client application 112 can synchronize data between client device 104 and content management system 102, and provide a user interface to the user of client device 104. Specifically, a preset portion of file system 112 can be designated as content to be synchronized with content management system 102. For example, one or more folders and any files contained in those folders can be set up for synchronization with content management system 102. As such, the contents of those folders can be copied over to remote storage of content management system 102, and any changes that occur in those folders, such as file creation, modification, renaming, deletion, etc., can be duplicated in the synchronized storage on content management system 102. Client application 110 can communicate with server 114 via network 106 to exchange content data and control data in order to keep those files and folders synchronized.

Client application 110 can also report user activities to content management system 102 so that they can be recorded in activity journal 118. To facilitate this, client application 110 can monitor file system 112 directly or communicate with operating system 108 to obtain information about file system 112 in order to detect any user activities that might be relevant to client application 110 and/or server 114. For example, when the user opens a document that is designated as synchronized content, client application 110 can detect the document being accessed and report it to server 114 via network 106. Such report can include, for example, the name of the file, date and time of access, user account associated with the access, access duration, client device identity, etc. The reports can be sent to server 114 one report at a time whenever a new activity is detected, or multiple reports can be periodically sent to server 114 in a batch. Server 114 can receive these activity reports or logs from multiple client devices to create a master log of the user's activity across the multiple client devices and store the log in activity journal 118.

Although FIG. 1 shows server 114 as maintaining activity journal 118 to keep track of user activities on client device 104, in some embodiments, client device 104 and other client devices can keep their own local activity journals (not shown) in a distributed fashion. In such embodiments, client device 104 can exchange journal data with other client devices to get the full picture of the user's activities across multiple client devices. In some aspects, client application 110 can access file system 112, and especially its metadata, to obtain a snapshot of the content being synchronized with content management system 102. For example, client application 110 can read in the relevant files and folders' metadata such as filename, size, creation time, last modification time, last access time, etc. to create or augment activity reports and/or journal entries.

Client application 110 may also present a list of recent activities via a user interface. For example, a mobile app for content management system 102 can show a number of recent activities (e.g., file being accessed, created, modified, etc.) to its user for convenient navigation and access. In another example, the web interface for content management system 102 may also contain a section dedicated to a list of recent activities and/or updates with regards to the user's content synchronized with content management system 102. Client application 110 can create the list of recent activities and update the list by requesting recent activities data from server 114. Client application 110 can send such requests periodically (i.e., when the information is a predetermined amount of time stale) or when the user triggers a refresh. Server 114 can access its activity journal 118 to retrieve recent journal entries that are relevant to the user account. Server 114 may filter out some less relevant entries. For example, the filtered results may only contain journal entries that are newer than a threshold date and time. The results can also be filtered by the types of access. For example, only some types of access (e.g., creation, modification, deletion) may be retrieved from activity journal 118, while other types of access (e.g., opening, sharing) may be filtered out. In some aspects, the filtered results may only contain journal entries that pertain to the user account associated with client device 104, while in some other aspects the results may contain journal entries that also pertain to other user accounts. For example, depending on the system's configuration and/or user preference, the filtered results can include journal entries describing activities of other users. Specifically, the filtered results can include descriptions of other users accessing the files or folders shared by the user account associated with client device 104.

Server 114 can then transmit the retrieved journal entries to client application 110 via network 106. Client application 110 can further filter the received journal entries if necessary according to its own criteria such as user preference. Client application 110 can create a list of recent activities based on the received journal entries and present the list to the user via its user interface. As will be discussed later, some activities can be consolidated or aggregated to make the presentation more compact. Although the aggregation may take place on client device 104 by client application 110, it can be performed by server 114 as well.

Figure 2:
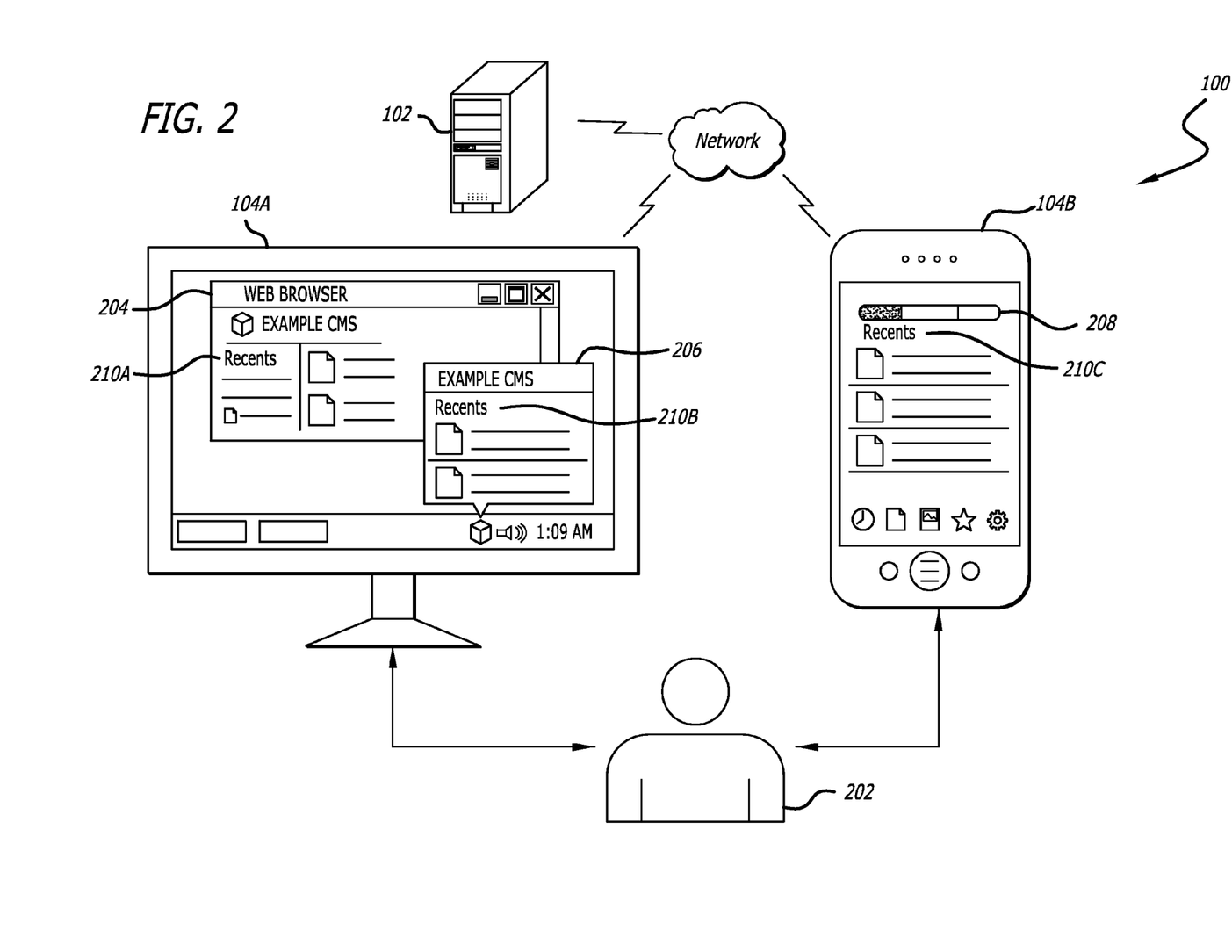
FIG. 2 shows an exemplary system embodiment for monitoring and presenting recent activities for a user of a synchronized online content management system across multiple client devices.

FIG. 2 shows an exemplary system embodiment for monitoring and presenting recent activities for a user of a synchronized online content management system across multiple client devices and across multiple platforms. Exemplary content management system 102 may run on one or more servers. User 202 can use one or more client devices, such as client device 104A and client device 104B, to communicate with content management system 102 via network 106 to synchronize content and exchange control data. In this exemplary system, user 202 is seen as using desktop computer 104A and mobile phone 104B to synchronize user data with content management system 102 and access synchronized data on content management system 102. Although only two client devices 104A, 104B are shown in FIG. 2, one of skill in the art will understand that monitoring and presenting recent activities can be done with three or more client devices can be used. Monitoring and presenting recent activities may also be done cross-platform, meaning that the client devices can be based on multiple platforms (i.e., heterogeneous operating systems, system environments, processors, architectures, and/or application program interfaces).

Client devices 104A, 104B can have various applications 204, 206, 208 running on them. These applications can be associated with content management system 102. For example, user 202 can use web browser 204 running on desktop computer 104A to access content management system 102 (named "Example CMS" in this example). Client device 104A may also have dedicated client application 206 installed and running on it. Client application 206 can execute in the foreground or background to monitor the device's file system and synchronize content whenever it detects a change, such as adding, modifying, or deleting a file or folder. Client application 208 running on mobile device 104B can also monitor and synchronize data stored in device 104B. Client application 208 may be a dedicated "Example CMS" mobile app that is designed to interact with "Example CMS" content management system 102. User 202 can also use a mobile web browser (not shown) on mobile device 104B to access content management system 102. Client applications 204, 206, 208 can present to user 202 information related to content management system 102 through its user interface, allow user 202 to access data on content management system 102. For example, user 202 can browse various contents (e.g., folders, files, documents, etc.) stored on content management system 102 under her user account, and open, view, download, or share all or part of her user data. User 202 can also upload additional content to content management system 102 through client applications 204, 206, 208 or modify existing data. Client applications 204, 206, 208 can also detect any changes in the local storage (especially with regards to the files and folders that are marked for synchronization with content management system 102) and synchronize the data with content management system 102. Moreover, client applications 204, 206, 208 can communicate with content management system 102 and download any new or updated content from content management system 102 or other client devices when the content has been updated or modified elsewhere.

Client applications 204, 206, 208 can display recent activities that are associated with user 202 and her user account. Recent activities may include, but are not limited to, creating content, viewing content, moving content, copying content, editing content, modifying content, renaming content, removing content, sharing content, revoking content sharing, etc. Such recent activities and/or the content items involved in those activities can be displayed as a list (also called "recents"). For example, recents 210A can display on web browser 204 a collection of content items that have been accessed, modified, etc. by user 202 recently. Similarly, recents 210B and recents 210C can display recently accessed content items on client application 206 and client application 208, respectively. Recents 210A-C can display a list of local recent items or global recent items. For example, recents 210B may be configured to display a list of content items that have been accessed by user 202 on client device 104A only, or it can be configured to display a list of content items that have been accessed by user 202 regardless of which client device was used to access the content. Recents 210A-C can be the default view of the respective client application's user interface when the application is opened. How far recents 210A-C go back in time can be defined by user 202 or an administrator of content management system 102. For example, recents 210A-C may be configured to display any content items that have been accessed, created, modified, etc. within the last 7 days or any other suitable time period. Recents 210A-C can be set up to go back different amounts of time depending on client applications 204, 206, 208. For example, recents 210A of web browser 204 may be configured to display recent items of the last 24 hours while recents 210C of mobile application 208 may be configured to display recent items of the last 5 days. Furthermore, content items displayed on recents 210A-C can be consolidated for more compact and organized presentation.

Figure 3:
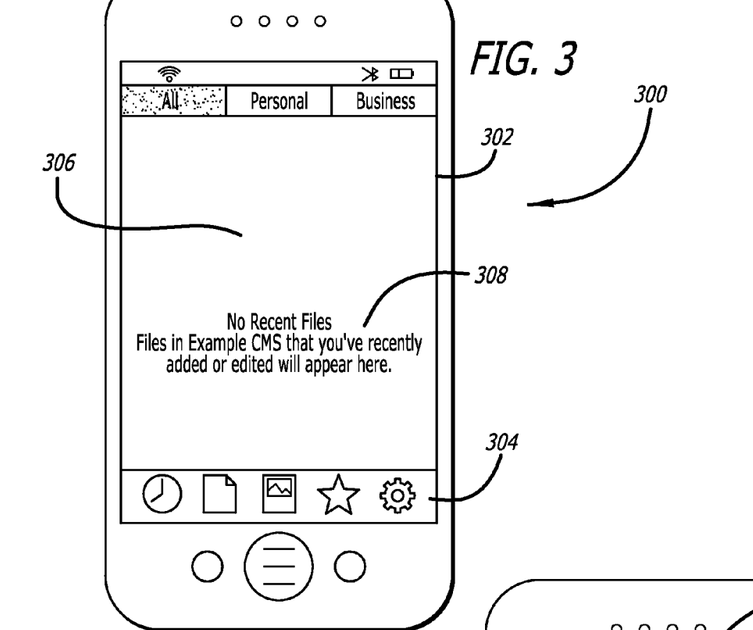
FIG. 3 shows an exemplary user interface for presenting recent activities.

FIG. 3 shows an exemplary user interface for presenting recent activities. This example represents a user interface for client application 302 running on mobile client device 300, although client applications running on other types of client devices such as a personal computer may feature a similar user interface. The client application offers different views including Recents, Files, Photos, Favorites, and Settings. The user can interact with menu icons 304 at the bottom of the screen to access different views. In FIG. 3, the Recents view is currently selected for the client application, but no content items are displayed in recents view area 306 because Example CMS identified no files or folders that have been recently added or edited. Instead, the client application displays exemplary placeholder message 308 that informs the user that "Files in Example CMS that you've recently added or edited will appear here." Other messages may be used instead.

Figure 4:
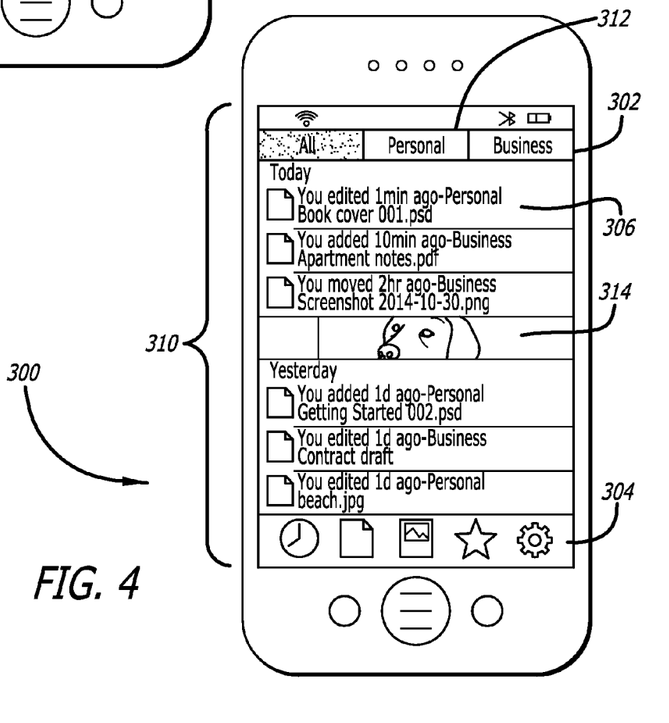
FIG. 4 shows another exemplary user interface for presenting recent activities.

As a continuing example from FIG. 3, FIG. 4 shows another exemplary view of the user interface for presenting recent activities. Here, the recents view is selected on the client application. Optionally, recents view area 306 can be divided up into one or more time groups (e.g., "TODAY," "YESTERDAY," "SUNDAY," "LAST WEEK," "LAST MONTH," "OLDER," etc.) for easier navigation for the user. Recents view area 306 may display one or more content items 310 that have been recently accessed, edited, moved, etc. by the user. Depending on the configuration, other users' recent activities may be also listed here. For example, if the user of the client application has shared a specific folder with a colleague, the recent activities of the colleague with regards to the shared folder can be shown in recents display area 306.

Each item in recents view area 306 may consist of an icon to represent the content item, a type of activity (e.g., "added," "edited," "moved," "copied," "shared," etc.), a timestamp for the activity, a user account type/identity (e.g., "personal," "business," "school," etc.), a filename, an alias, a preview, a client device identity (i.e., which client device was used to access or edit the content item), a tag, a priority, a personal note, etc. If the user has more than one user account with the content management system, those user accounts can be combined in the recents view. For example, the recents view area can display both the content item "Book cover 001.psd," which was edited 1 minute ago by using the user's "personal" user account and the content item "Apartment notes.pdf," which was added 10 minutes ago by using the user's "business" user account.

The user can interact with user account selection area 312 to filter out recent activities of one or more user accounts or see all the results. For example, by manipulating or interacting with (e.g., clicking, tapping, swiping, toggling, etc.) the area in the user interface that is labeled "All/Personal/Business," the user can filter the recents entries to only show those that are associated with her "Personal" user account by selecting the "Personal" filter. Similarly, the user can choose to see only the entries that are related to her "Business" user account by selecting the "Business" filter. By the same token, she can select the "All" button to display every recents entry in the user interface regardless of its association with a particular user account. One of skill in the art will understand that other criteria, other than user account types, can be used to filter the recents list. The criteria can include, but are not limited to, date, category, priority, sharing user, file size, and attachment.

Moreover, depending on the type of content item and when appropriate, each recents item can include preview 314 of the content item. For example, since the content item named "Screenshot 2014-10-30.png" is a picture, a thumbnail view or snippet of the picture can be presented alongside the item descriptions. In other examples, a word processor document can be displayed with a preview or excerpt of the document, and an audio or video file can be presented with a play button to play an excerpt or entirety of the audio/video file.

Recents view area 306 can be scrolled horizontally or vertically to reveal more recently accessed or edited items. Each item in the recents view area can be associated with a link to the displayed content item. In other words, when a user clicks on or other interacts with a content item in the recents view area, client application 302 can perform a default action (e.g., "open") with that content item. This allows the user to find and navigate to recently accessed content items with increased speed and ease. Alternatively, client application 302 can offer more interaction options to the user when the user selects a content item. For example, instead of opening the content item, the client application can present a menu of options for the user to choose from.

The options can include, for example, "open" (i.e., open with a default application), "open with" (i.e., allow the user to choose an application to open the content item with), "open folder location," "copy," "copy link," "rename," "delete," "undo," "favorite," "like," "share," etc. A secondary action may also be linked to a secondary interaction with the content item. For instance, when the user swipes a recents entry instead of tapping it, client application 302 can perform the secondary action of "sharing."

Figure 5:
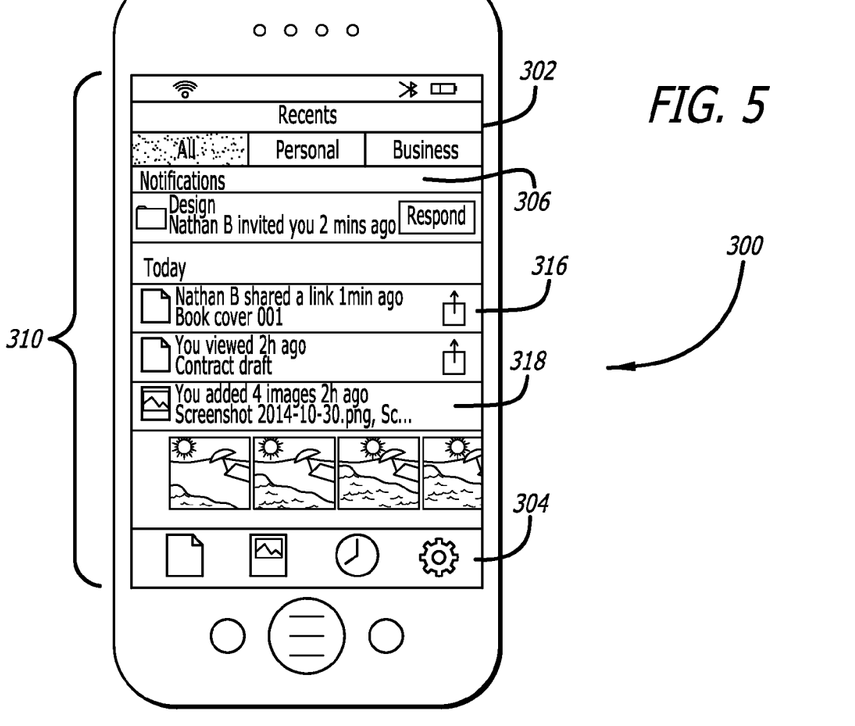
FIG. 5 shows yet another exemplary user interface for presenting recent activities.

As a continuing example from FIG. 4, FIG. 5 shows yet another exemplary view of the user interface for presenting recent activities 310. In this example, the recents view is seen to exhibit additional functionalities. Recents view area 306 can incorporate notification messages that can inform the user of important events related to the content management system. Such events can include invitation to join a shared folder, membership information update (e.g., membership renewal reminder, service upgrade confirmation), service update notice, personal messaging, friend recommendations, security warnings, etc. Notification messages can be coupled with interactive elements such as a button for performing quick follow-up actions such as "join," "ignore," "respond," "reply," "view," "dismiss," "learn more," "add," "update," "ok," "undo," etc. A recents item can also be about a recent activity of a user other than the user of client application 302. For example, if content management system has social networking functionalities and allows the user to have social connections with other users ("friends"), then any recent activities by the friends of the user may also show up in recents view area 306. A recents item can also have icons or menu options that allow the user to perform quick actions with the respective content item. For example, the recents entry for "Book cover 0001" can be displayed with download icon 316 that allows the user to download the file with a single tap of a finger or a click of a mouse button. Other types of buttons can allow the user, for example, to open, share, edit, rename, copy, move, or delete the content item.

Client application 302 can also intelligently aggregate related items into fewer recents entries. Specifically, files that meet certain criteria can be compounded into one recents entry instead of multiple entries in recents view area 306. These criteria can be (i) the same or similar folder location, (ii) proximity in time (e.g., ten files renamed within five seconds), (iii) similar file type, (iv) similar filenames (e.g., "DSC0121.jpg" and "DSC0122.jpg"; "product A testing.mov" and "product B testing.mov"), (v) geographic proximity (e.g., photos taken near Grand Canyon National Park), (vi) other user-defined criteria, or (vi) any combination of the above. Aggregated recents entry 318 can take up less space in the application's user interface because duplicate information, such as folder location and timestamp, can be displayed only once instead of multiple times for each instance of related content item. In some aspects, the user can expand or collapse the aggregated entry at will to see the individual content items or one consolidated content items entry. The aggregation can be done across multiple devices and multiple platforms. Thus, for example, one file accessed on a Windows®-based laptop computer and another file accessed on an iOS®-based smartphone can be aggregated into one recents entry if the two files are determined to be similar enough according to one or more of the criteria discussed above.

In some aspects, the recents view may allow the user to "pin" one or more frequently accessed content items so that they will be always included in the recents list regardless of their recent activity. In other aspects, if a client device is equipped with a camera, taking pictures with the camera can automatically trigger synchronization of those pictures with the content management system. In such a case, the camera photo uploads can be treated in special ways when they show up in recents view area 306. For example, camera uploads can be identified or emphasized as a separate category or activity type. Depending on the configurations, the camera uploads can be suppressed entirely from being displayed in the recents view area to prevent too much clutter from taking up space in recents view area 306. In some configurations, all the camera uploads can be aggregated into one recents entry. According to some other configurations, the recents view area can simply display a message that indicates to the user that camera uploads feature is enabled, without actually displaying the individual recent activity entries for the camera uploads in recents view area 306.

Figure 6:
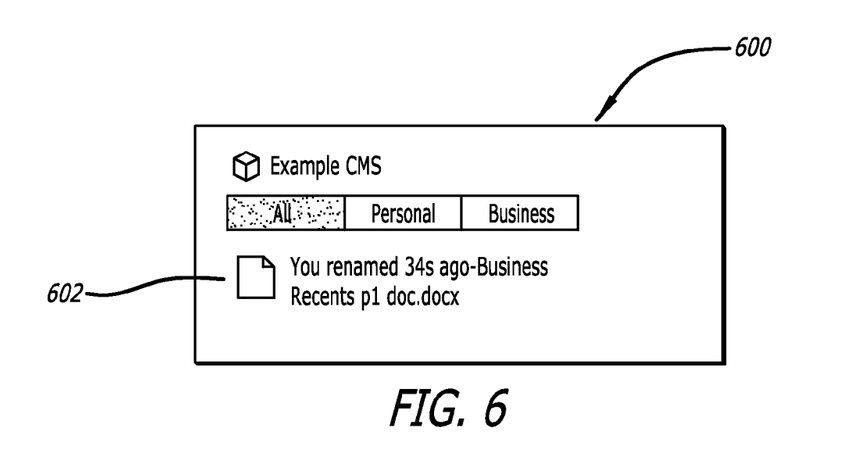
FIG. 6 shows an exemplary notification message for presenting recent activities.

FIG. 6 shows an exemplary notification message for presenting recent activities. The client application can display recents entries 602 in the form of notification message 600 in a specially designated notification area of the client device. For example, some mobile operating systems, such as Android® or iOS®, can display notification messages when the user performs a predefined action (e.g., swiping a finger away from an edge of the screen. Desktop operating systems, such as Windows®, MacOS®, and Linux®, may also have notification areas that can pop up on the screen or be shown as small icons, word balloons, etc. Third-party applications can insert various messages in such notification areas (e.g., "system tray," "Today Widget," "notification bar," etc.). The content management system's dedicated client can also display the user's recent activities and recently accessed content items in the notification area. When individual recents entry is accessed by the user, the client application can perform a default action such as opening the corresponding content item, or allow the user to choose from various actions (e.g., "open," "open with," "open folder location," "copy," "copy link," "rename," "delete," "undo," "share," etc.).

Figure 7:
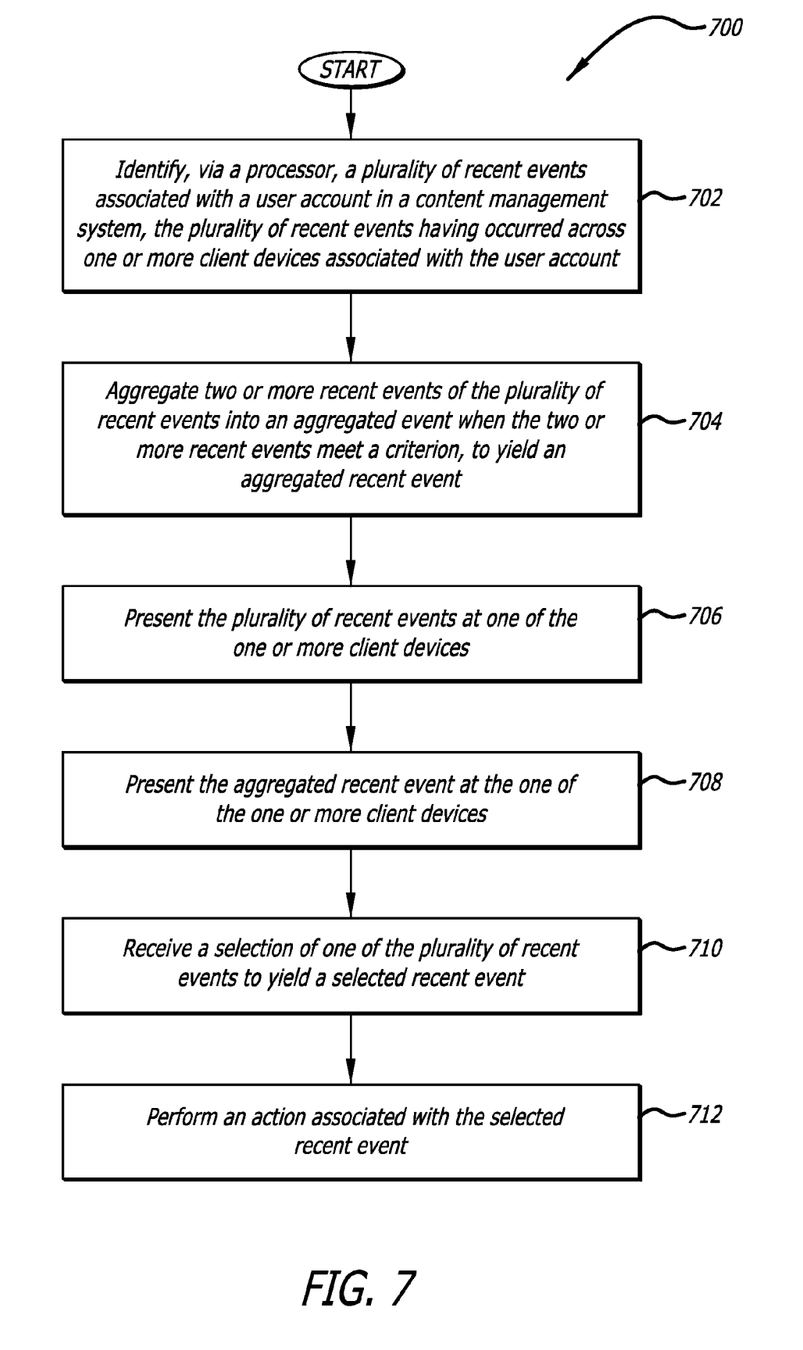
FIG. 7 shows an exemplary method for presenting recent events.
Figure 8:
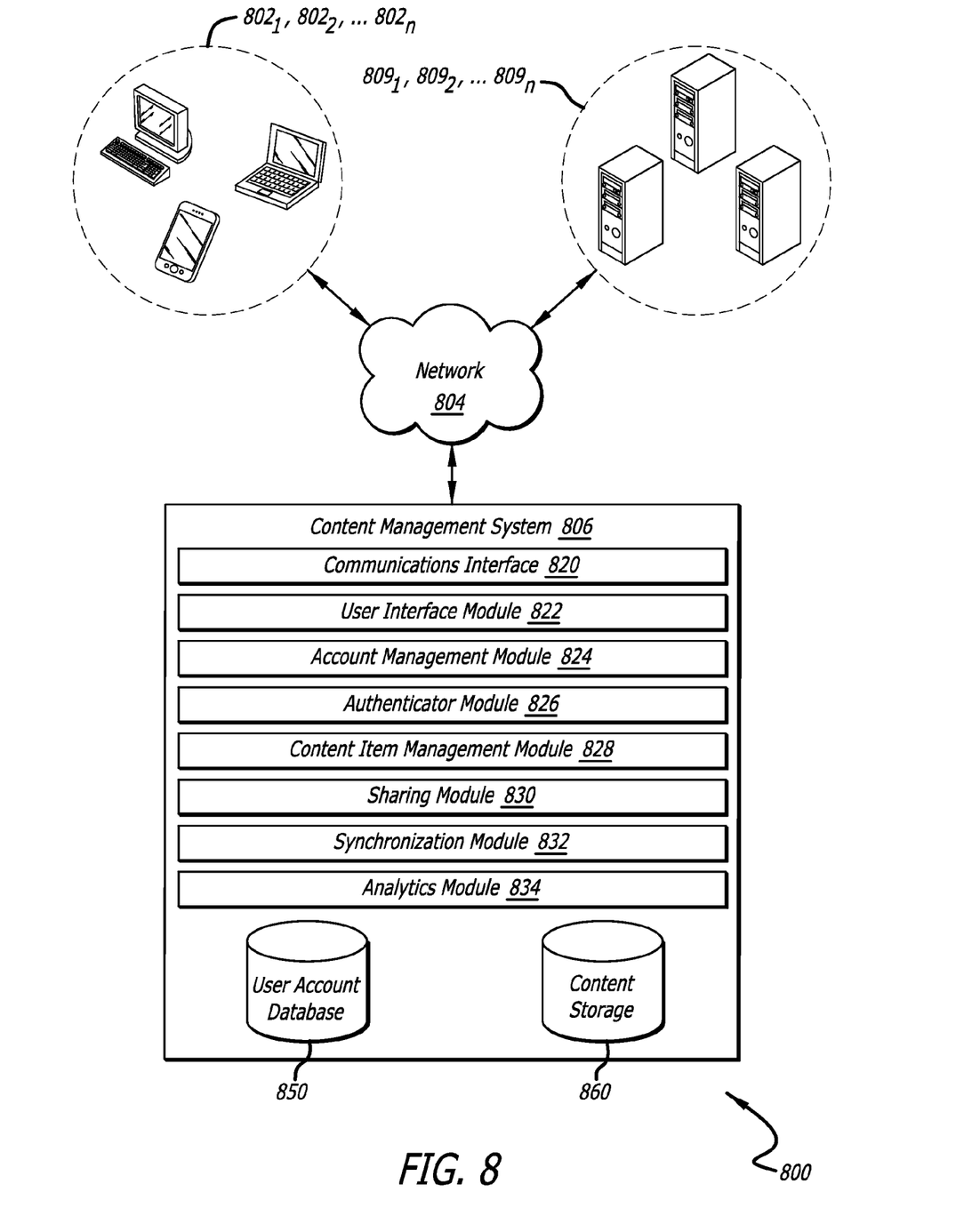
FIG. 8 shows an exemplary configuration of devices and a network in accordance with the invention.
Figure 9A:
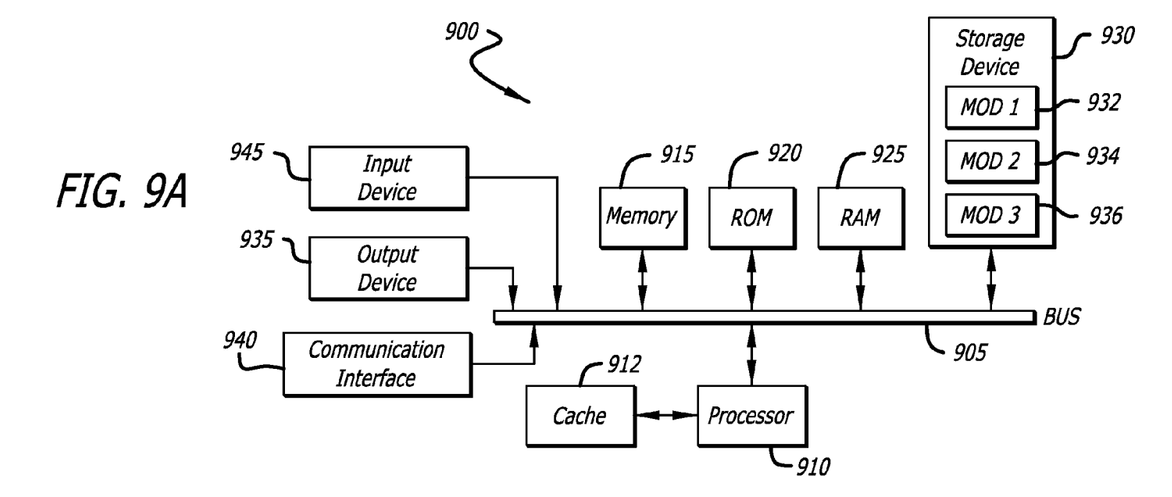
FIGS. 9A and 9B show exemplary system embodiments.
Figure 9B:
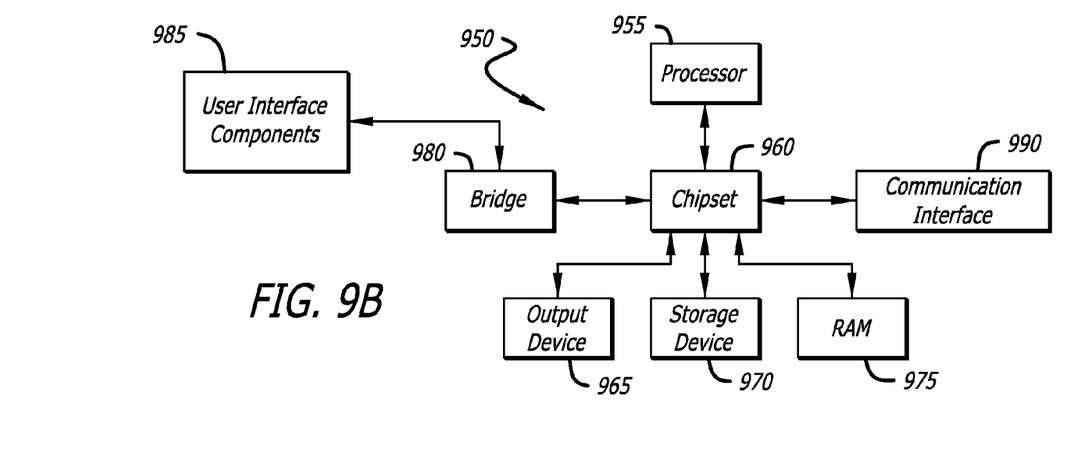

Having disclosed some basic concepts, the disclosure now turns to the example method embodiment shown in FIG. 7. For the sake of clarity, the methods are described in terms of system 800, as shown in FIG. 8 and discussed below in more detail, configured to practice the method. Alternatively, however, the method may also be practiced by system 900 as shown in FIG. 9A or system 950 as shown in FIG. 9B. The steps outlined herein are exemplary and can be implemented in any combination thereof in any order, including combinations that exclude, add, or modify certain steps.

FIG. 7 shows an exemplary method of presenting recent events. System 800 can identify, via a processor, a plurality of recent events associated with a user account in a content management system, the plurality of recent events having occurred across one or more client devices associated with the user account (702). The plurality of recent events can be creating a content item, modifying a content item, viewing a content item, accessing a content item, renaming a content item, deleting a content item, sharing a content item, and/or revoking a share. These and other events can be logged into a journal maintained by a client device or a server as they take place in substantially real time. Relevant journal entries or records can then be later retrieved for the purpose of creating and presenting a list of recent events. System 800 can collect recent events that have occurred across one or more client devices having one or more disparate platforms. For example, some events may have taken place on a Windows® PC while others may have taken place on an iPhone®. The identified recent events may have occurred within a threshold time duration in a past. In other words, system 800 can be set up to identify only those events that have taken place, for example, within the last 7 days. Moreover, a user can have more than one user account, and each of the recent events may be associated with one of these multiple user accounts. Thus, for example, some events may be related to the user's "personal" user account while some other events may be related to the user's "business" user account.

System 800 can aggregate two or more recent events of the plurality of recent events into an aggregated event when the two or more recent events meet a criterion, to yield an aggregated recent event (704). The criterion can be folder location similarity, proximity in time, file type similarity, file name similarity, geographic proximity, and/or user preference. System 800 can also use a combination of one or more of these criteria to aggregate those events that are similar enough to each other. System 800 can then present the plurality of recent events at one of the one or more client devices (706). System 800 can also present the aggregated recent event at the one of the one or more client devices (708). The recent events and the aggregated recent events can be presented to the user as a list that includes icons, metadata, timestamps, previews, triggering actions, etc.

The user can interact with the list of recent events by clicking on, tapping, tapping and holding, and/or swiping one or more entries in the list. When the user makes a selection from the list, system 800 can receive a selection of one of the plurality of recent events to yield a selected recent event (710). Based on the selection, system 800 can perform an action associated with the selected recent event (712). The action can be to open, open folder location, copy, copy link, rename, delete, undo, favorite, like, and/or share. A secondary action can be also assigned to each of the items in the recents list.

FIG. 8 shows an exemplary configuration of devices and a network in accordance with the invention. An exemplary system configuration 800 for enabling access to content of a compressed content item from a variety of computing devices is shown in FIG. 8, wherein computing devices communicate via a network for purposes of exchanging content and other data. The system can be configured for use on a wide area network such as that illustrated in FIG. 8. However, the present principles are applicable to a wide variety of network configurations that facilitate the intercommunication of electronic devices. For example, each of the components of system 800 in FIG. 8 can be implemented in a localized or distributed fashion in a network.

In system 800, a user can interact with online content management system 806 through computing devices 802₁, 802₂, . . . , 802ₙ (collectively "802," also known as client devices) connected to network 804 by direct and/or indirect communication. Content management system 806 can support connections from a variety of different computing devices, such as desktop computers; mobile computers; mobile communications devices, e.g. mobile phones, smart phones, tablets; smart televisions; set-top boxes; and/or any other network enabled computing devices. Computing devices 802 can be of varying type, capabilities, operating systems, etc. Furthermore, content management system 806 can concurrently accept connections from and interact with multiple computing devices 802.

A user can interact with content management system 806 via a client-side application installed on computing device 802$_i$. In some embodiments, the client-side application can include a content management system specific component. For example, the component can be a stand-alone application, one or more application plug-ins, and/or a browser extension. However, the user can also interact with content management system 806 via a third-party application, such as a web browser, that resides on computing device 802$_i$ and is configured to communicate with content management system 806. In either case, the client-side application can present a user interface (UI) for the user to interact with content management system 806. For example, the user can interact with the content management system 806 via a client-side application integrated with the file system or via a webpage displayed using a web browser application. Each of computing devices 802 and any client-side or third-party applications running on computing devices 802 may be considered an access platform, by which a user may access synchronized content on content management system 806.

Synchronized content management system 806 (also known as "online content management system," "content management system," "file hosting service," "cloud storage service," "online file synchronization service," etc.) can make it possible for a user to store content, as well as perform a variety of content management tasks, such as retrieve, modify, browse, and/or share the content. Furthermore, content management system 806 can make it possible for a user to access the content from multiple computing devices 802. For example, computing device 802$_i$ can upload content to content management system 806 via network 804. The content can later be retrieved from content management system 806 using the same computing device 802$_i$ or some other computing device 802$_j$. Although the term "synchronized content management system" and its variants are typically used to refer to the server-side or administrator-side of system 800, they can also be used as an umbrella term for system 800 itself, which includes the entire eco-system of client devices 802, content providers 809, network 804, and the servers.

To facilitate the various content management services, a user can create an account with content management system 806. The account information can be maintained in user account database 850. User account database 850 can store profile information for registered users. In some cases, the only personal information in the user profile can be a username and/or email address. However, content management system 806 can also be configured to accept additional user information.

User account database 850 can also include account management information, such as account type, e.g. free or paid; usage information, e.g. file edit history; maximum storage space authorized; storage space used; content storage locations; security settings; personal configuration settings; content sharing data; etc. Account management module 824 can be configured to update and/or obtain user account details in user account database 850. Account management module 824 can be configured to interact with any number of other modules in content management system 806.

An account can be used to store content, such as digital data, documents, text files, audio files, video files, etc., from one or more computing devices 802 authorized on the account. The content can also include folders of various types with different behaviors, or other mechanisms of grouping content items together. For example, an account can include a public folder that is accessible to any user. The public folder can be assigned a web-accessible address. A link to the web-accessible address can be used to access the contents of the public folder. In another example, an account can include a photos folder that is intended for photos and that provides specific attributes and actions tailored for photos; an audio folder that provides the ability to play back audio files and perform other audio related actions; or other special purpose folders. An account can also include shared folders or group folders that are linked with and available to multiple user accounts. The permissions for multiple users may be different for a shared folder.

The content can be stored in content storage 860. Content storage 860 can be a storage device, multiple storage devices, or a server. Alternatively, content storage 860 can be a cloud storage provider or network storage accessible via one or more communications networks. Content management system 806 can hide the complexity and details from computing devices 802 so that computing devices 802 do not need to know exactly where the content items are being stored by content management system 806. In one variation, content management system 806 can store the content items in the same folder hierarchy as they appear on computing device 802$_i$. However, content management system 806 can store the content items in its own order, arrangement, or hierarchy. Content management system 806 can store the content items in a network accessible storage (SAN) device, in a redundant array of inexpensive disks (RAID), etc. Content storage 860 can store content items using one or more partition types, such as FAT, FAT32, NTFS, EXT2, EXT3, EXT4, ReiserFS, BTRFS, and so forth.

Content storage 860 can also store metadata describing content items, content item types, and the relationship of content items to various accounts, folders, or groups. The metadata for a content item can be stored as part of the content item or can be stored separately. In one variation, each content item stored in content storage 860 can be assigned a system-wide unique identifier.

Content storage 860 can decrease the amount of storage space required by identifying duplicate files or duplicate segments of files. Instead of storing multiple copies, content storage 860 can store a single copy and then use a pointer or other mechanism to link the duplicates to the single copy. Similarly, content storage 860 can store files more efficiently, as well as provide the ability to undo operations, by using a file version control that tracks changes to files, different versions of files (including diverging version trees), and a change history. The change history can include a set of changes that, when applied to the original file version, produce the changed file version. Content storage 860 can also include an activity journal that keeps track of each user's content access history such as creating, adding, opening, viewing, downloading, modifying, or sharing content.

Content management system 806 can be configured to support automatic synchronization of content from one or more computing devices 802. The synchronization can be platform agnostic. That is, the content can be synchronized across multiple computing devices 802 of varying type, capabilities, operating systems, etc. For example, computing device 802$_i$ can include client software, which synchronizes, via a synchronization module 832 at content management system 806, content in computing device 802$_i$'s file system with the content in an associated user account. In some cases, the client software can synchronize any changes to content in a designated folder and its sub-folders, such as new, deleted, modified, copied, or moved files or folders. The client software can be a separate software application, can integrate with an existing content management application in the operating system, or some combination thereof. In one example of client software that integrates with an existing content management application, a user can manipulate content directly in a local folder, while a background process monitors the local folder for changes and synchronizes those changes to content management system 806. Conversely, the background process can identify content that has been updated at content management system 806 and synchronize those changes to the local folder. The client software can provide notifications of synchronization operations, and can provide indications of content statuses directly within the content management application. Sometimes computing device 802$_i$ may not have a network connection available. In this scenario, the client software can monitor the linked folder for file changes and queue those changes for later synchronization to content management system 806 when a network connection is available. Similarly, a user can manually stop or pause synchronization with content management system 806.

A user can also view or manipulate content via a web interface generated and served by user interface module 822. For example, the user can navigate in a web browser to a web address provided by content management system 806. Changes or updates to content in the content storage 860 made through the web interface, such as uploading a new version of a file, can be propagated back to other computing devices 802 associated with the user's account. For example, multiple computing devices 802, each with their own client software, can be associated with a single account and files in the account can be synchronized between each of the multiple computing devices 802.

Content management system 806 can include a communications interface 820 for interfacing with various computing devices 802, and can interact with other content and/or service providers 809$_1$, 809$_2$, ..., 809$_n$ (collectively "809") via an Application Programming Interface (API). Certain software applications can access content storage 860 via an API on behalf of a user. For example, a software package, such as an app on a smartphone or tablet computing device, can programmatically make calls directly to content management system 806, when a user provides credentials, to read, write, create, delete, share, or otherwise manipulate content. Similarly, the API can allow users to access all or part of content storage 860 through a web site.

Content management system 806 can also include authenticator module 826, which can verify user credentials, security tokens, API calls, specific computing devices, and so forth, to ensure only authorized clients, web browsers, and users can access files. Authenticator module 826 may generate security codes, tokens, or nonces. Authenticator module 826 may also store the codes, tokens, and nonces generated by authenticator module 826 or received from client applications in, for example, user account database 850. Authenticator module 826 can compare the stored values with the values of codes, tokens, and nonces received from web browsers to authenticate the web browsers. Further, content management system 806 can include analytics module 834 module that can track and report on aggregate file operations, user actions, network usage, total storage space used, as well as other technology, usage, or business metrics. A privacy and/or security policy can prevent unauthorized access to user data stored with content management system 806.

Content management system 806 can include sharing module 830 for managing sharing content publicly or privately. Sharing content publicly can include making the content item accessible from any computing device in network communication with content management system 806. Sharing content privately can include linking a content item in content storage 860 with two or more user accounts so that each user account has access to the content item. The sharing can be performed in a platform agnostic manner. That is, the content can be shared across multiple computing devices 802 of varying type, capabilities, operating systems, etc. The content can also be shared across varying types of user accounts.

In some embodiments, content management system 806 can include a content item management module 828 for maintaining a content directory. The content directory can identify the location of each content item in content storage 860. The content directory can include a unique content entry for each content item stored in the content storage.

A content entry can include a content path that can be used to identify the location of the content item in a content management system. For example, the content path can include the name of the content item and a folder hierarchy associated with the content item. For example, the content path can include a folder or path of folders in which the content item is placed as well as the name of the content item. Content management system 806 can use the content path to present the content items in the appropriate folder hierarchy.

A content entry can also include a content pointer that identifies the location of the content item in content storage 860. For example, the content pointer can include the exact storage address of the content item in memory. In some embodiments, the content pointer can point to multiple locations, each of which contains a portion of the content item.

In addition to a content path and content pointer, a content entry can also include a user account identifier that identifies the user account that has access to the content item. In some embodiments, multiple user account identifiers can be associated with a single content entry indicating that the content item has shared access by the multiple user accounts.

To share a content item privately, sharing module 830 can be configured to add a user account identifier to the content entry associated with the content item, thus granting the added user account access to the content item. Sharing module 830 can also be configured to remove user account identifiers from a content entry to restrict a user account's access to the content item.

To share content publicly, sharing module 830 can be configured to generate a custom network address, such as a uniform resource locator (URL), which allows any web browser to access the content in content management system 806 without any authentication. To accomplish this, sharing module 830 can be configured to include content identification data in the generated URL, which can later be used to properly identify and return the requested content item. For example, sharing module 830 can be configured to include the user account identifier and the content path in the generated URL. Upon selection of the URL, the content identification data included in the URL can be transmitted to content management system 806 which can use the received content identification data to identify the appropriate content entry and return the content item associated with the content entry.

In addition to generating the URL, sharing module 830 can also be configured to record that a URL to the content item has been created. In some embodiments, the content entry associated with a content item can include a URL flag indicating whether a URL to the content item has been created. For example, the URL flag can be a Boolean value initially set to 0 or false to indicate that a URL to the content item has not been created. Sharing module 830 can be configured to change the value of the flag to 1 or true after generating a URL to the content item.

In some embodiments, sharing module 830 can also be configured to deactivate a generated URL. For example, each content entry can also include a URL active flag indicating whether the content should be returned in response to a request from the generated URL. For example, sharing module 830 can be configured to only return a content item requested by a generated link if the URL active flag is set to 1 or true. Thus, access to a content item for which a URL has been generated can be easily restricted by changing the value of the URL active flag. This allows a user to restrict access to the shared content item without having to move the content item or delete the generated URL. Likewise, sharing module 830 can reactivate the URL by again changing the value of the URL active flag to 1 or true. A user can thus easily restore access to the content item without the need to generate a new URL.

While content management system 806 is presented with specific components, it should be understood by one skilled in the art, that the architectural configuration of system 806 is simply one possible configuration and that other configurations with more or less components are also possible.

FIG. 9A, and FIG. 9B show exemplary possible system embodiments. Various devices disclosed throughout this disclosure, such as servers, client devices and virtual devices, may be implemented as system 900 of FIG. 9A or system 950 of FIG. 9B. The more appropriate embodiment will be apparent to those of ordinary skill in the art when practicing the present technology. Persons of ordinary skill in the art will also readily appreciate that other system embodiments are possible.

FIG. 9A shows a conventional system bus computing system architecture 9 wherein the components of the system are in electrical communication with each other using a bus 905. Exemplary system 900 includes a processing unit (CPU or processor) 910 and a system bus 905 that couples various system components including the system memory 915, such as read only memory (ROM) 920 and random access memory (RAM) 925, to the processor 910. The system 900 can include a cache of high-speed memory connected directly with, in close proximity to, or integrated as part of the processor 910. The system 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other system memory 915 may be available for use as well. The memory 915 can include multiple different types of memory with different performance characteristics. The processor 910 can include any general purpose processor and a hardware module or software module, such as module 1 932, module 2 934, and module 3 936 stored in storage device 930, configured to control the processor 910 as well as a special-purpose processor where software instructions are incorporated into the actual processor design. The processor 910 may essentially be a completely self-contained computing system, containing multiple cores or processors, a bus, memory controller, cache, etc. A multi-core processor may be symmetric or asymmetric.

To enable user interaction with the computing device 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art. In some instances, multimodal systems can enable a user to provide multiple types of input to communicate with the computing device 900. The communications interface 940 can generally govern and manage the user input and system output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof.

The storage device 930 can include software modules 932, 934, 936 for controlling the processor 910. Other hardware or software modules are contemplated. The storage device 930 can be connected to the system bus 905. In one aspect, a hardware module that performs a particular function can include the software component stored in a computer-readable medium in connection with the necessary hardware components, such as the processor 910, bus 905, display 935, and so forth, to carry out the function.

FIG. 9B shows a computer system 950 having a chipset architecture that can be used in executing the described method and generating and displaying a graphical user interface (GUI). Computer system 950 is an example of computer hardware, software, and firmware that can be used to implement the disclosed technology. System 950 can include a processor 955, representative of any number of physically and/or logically distinct resources capable of executing software, firmware, and hardware configured to perform identified computations. Processor 955 can communicate with a chipset 960 that can control input to and output from processor 955. In this example, chipset 960 outputs information to output 965, such as a display, and can read and write information to storage device 970, which can include magnetic media, and solid state media, for example. Chipset 960 can also read data from and write data to RAM 975. A bridge 980 for interfacing with a variety of user interface components 985 can be provided for interfacing with chipset 960. Such user interface components 985 can include a keyboard, a microphone, touch detection and processing circuitry, a pointing device, such as a mouse, and so on. In general, inputs to system 950 can come from any of a variety of sources, machine generated and/or human generated.

Chipset 960 can also interface with one or more communication interfaces 950 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 955 analyzing data stored in storage 970 or 975. Further, the machine can receive inputs from a user via user interface components 985 and execute appropriate functions, such as browsing functions by interpreting these inputs using processor 955.

It can be appreciated that exemplary systems 900 and 950 can have more than one processor 910 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Thus, the claims are not intended to be limited to the aspects shown herein, but are to be accorded the full scope consistent with the language claims, wherein reference to an element in the singular is not intended to mean "one and only one" unless specifically so stated, but rather "one or more."

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs. Moreover, claim language reciting "at least one of" a set indicates that one member of the set or multiple members of the set satisfy the claim.

What is claimed is:

1. A method comprising:
   receiving, by at least one processor at a content management system, a first activity journal from a first client application associated with the content management system on a first client device, wherein the first activity journal comprises a first plurality of recent events associated with content item activity in a user account of the content management system, the first plurality of recent events having occurred at the first client device;
   receiving, by at least one processor at the content management system, a second activity journal comprising a second plurality of recent events associated with content item activity from a second client application associated with the content management system on a second client device;
   identifying, by at least one processor at the content management system, two or more recent events of the first and second plurality of recent events identified by the first activity journal and the second activity journal for a content item that meet a criterion;
   aggregating, by at least one processor at the content management system, the two or more recent events for the content item identified to meet the criterion;
   generating, by at least one processor at the content management system, an updated first activity journal based on the first plurality of recent events of the first activity journal and the second plurality of recent events of the second activity journal, and based on an aggregated recent event;
   sending, by the content management system, the updated first activity journal including the aggregated recent event to the first client device; and
   presenting, at the first client device, recent events from the updated first activity journal including the aggregated recent event to provide access to the content item within a folder structure at the first client device.

2. The method of claim 1, further comprising:
   receiving a selection of one of the first plurality of recent events to yield a selected recent event; and
   performing an action associated with the selected recent event.

3. The method of claim 1, wherein the criterion is one of folder location similarity, proximity in time, file type similarity, file name similarity, geographic proximity, or user preference.

4. The method of claim 1, wherein the first plurality of recent events comprises one of creating the content item, modifying the content item, viewing the content item, accessing the content item, renaming the content item, deleting the content item, sharing the content item, or revoking sharing the content item.

5. The method of claim 1, wherein the first plurality of recent events have occurred across one or more disparate platforms.

6. The method of claim 1, wherein the first plurality of recent events have occurred within a threshold time duration in a past.

7. The method of claim 1, wherein a user of the user account is associated with multiple user accounts, and wherein each recent event of the first plurality of recent events is associated with one of the multiple user accounts.

8. The method of claim 2, wherein the action is to one of open, open folder location, copy, copy link, rename, delete, undo, favorite, like, or share.

9. A system comprising:
   a processor; and
   a non-transitory computer-readable storage medium storing instructions which, when executed by the processor, cause the processor to perform operations comprising:
      receiving, by the processor at a content management system, a first activity journal from a first client application associated with the content management system on a first client device, wherein the first activity journal comprises a first plurality of recent events associated with a content item in a user account of the content management system, the first plurality of recent events having occurred at the first client device;
      receiving, by the processor at the content management system, a second activity journal comprising a second plurality of recent events associated with content item activity from a second client application associated with the content management system on a second client device;
      identifying two or more recent events of the first plurality of recent events of the first activity journal and the second plurality of recent events of the second activity journal for with the content item that meet a criterion;
      aggregating the two or more recent events for the content item identified to meet the criterion;
      generating, by the processor at the content management system, an updated first activity journal based on the first plurality of recent events of the first activity journal and the second plurality of recent events of the second activity journal, and based on an aggregated recent event;
      sending, by the content management system, the updated first activity journal including the aggregated recent event to the first client device; and
      presenting, at the first client device, recent events from the updated first activity journal including the aggregated recent event to provide access to the content item within a folder structure at the first client device.

10. The system of claim 9, wherein the first plurality of recent events have occurred across one or more disparate platforms within a threshold time duration in a past.

11. The system of claim 9, wherein the criterion is one of folder location similarity, proximity in time, file type similarity, file name similarity, geographic proximity, or user preference.

12. The system of claim 9, wherein the first plurality of recent events comprises one of creating the content item, modifying the content item, viewing the content item, accessing the content item, renaming the content item, deleting the content item, sharing the content item, or revoking sharing the content item.

13. A computer-readable storage device storing instructions which, when executed by a processor, cause the processor to perform operations comprising:

receiving, at a content management system, a first activity journal from a first client application associated with the content management system on a first client device, wherein the first activity journal comprises a first plurality of recent events associated with content item activity in a user account of the content management system, the first plurality of recent events having occurred at the first client device;

receiving, by at least one processor at a content management system, a second activity journal comprising a second plurality of recent events associated with content item activity from a second client application associated with the content management system on a second client device;

identifying two or more recent events of the first and second plurality of recent events identified by the first activity journal and the second activity journal for the content item that meet a criterion;

aggregating, at the content management system, the two or more recent events for the content item identified to meet the criterion to yield an aggregated recent event for the content item;

generating, by the content management system, an updated first activity journal based on the first plurality of recent events of the first activity journal and the second plurality of recent events of the second activity journal, and based on the aggregated recent event;

sending, by the content management system, the updated first activity journal including the aggregated recent event to the first client device; and presenting, at the first client device, recent events from the updated first activity journal including the aggregated recent event to provide access to the content item within a folder structure at the first client device.

14. The computer-readable storage device of claim 13, storing additional instructions which, when executed by a processor, cause the processor to perform operations comprising:

receiving a selection of one of the first plurality of recent events to yield a selected recent event; and performing an action associated with the selected recent event.

15. The computer-readable storage device of claim 14, wherein the action is to one of open, open folder location, copy, copy link, rename, delete, undo, favorite, like, or share.

16. The computer-readable storage device of claim 13, wherein the criterion is one of folder location similarity, proximity in time, file type similarity, file name similarity, geographic proximity, or user preference.

17. The computer-readable storage device of claim 13, wherein a user of the user account is associated with multiple user accounts, and wherein each recent event of the first plurality of recent events is associated with one of the multiple user accounts.

18. The computer-readable storage device of claim 13, wherein the first plurality of recent events comprises one of creating the content item, modifying the content item, viewing the content item, accessing the content item, renaming the content item, deleting the content item, sharing the content item, or revoking sharing the content item.

* * * * *